F. HEYDE.
ARTIFICIAL TEETH.
APPLICATION FILED SEPT. 15, 1913.

1,112,697.

Patented Oct. 6, 1914.

Witness:

Inventor,
Friedrich Heyde
By
Atty

UNITED STATES PATENT OFFICE.

FRIEDRICH HEYDE, OF TEGEL, NEAR BERLIN, GERMANY.

ARTIFICIAL TEETH.

1,112,697.  Specification of Letters Patent.  Patented Oct. 6, 1914.

Application filed September 15, 1913. Serial No. 789,846.

*To all whom it may concern:*

Be it known that I, FRIEDRICH HEYDE, a subject of the Emperor of Germany, residing at Tegel, near Berlin, Germany, have invented certain new and useful Improvements in Artificial Teeth, of which the following is a specification.

This invention relates to improvements in dentures or sets of artificial teeth having interchangeable teeth, wherein the teeth can be connected to the plate after the manner of a snap-button.

In the denture or sets of artificial teeth of this kind heretofore known, the teeth are backed with plates provided with buttons adapted to be pressed into recesses in the plate of the denture. This arrangement presents the disadvantage that the teeth by reason of the backing plates cannot make a deep bite. Moreover these dentures present the disadvantage that the teeth are liable to become loose and to become detached, whereby serious injury may be caused.

It is the purpose to obviate all these disadvantages by the improvement in artificial teeth according to the present invention providing means for permitting a deep bite of the teeth and for effectively preventing loosening and accidental detachment of the teeth. For this purpose, backing plates for the teeth are entirely dispensed with and the teeth are themselves provided with recesses in order to enable them to be pressed on to projections on the plate of the denture after the manner of snap-buttons. In order to prevent loosening and detachment, there is introduced into the recess in the tooth a spring-piece, which is preferably secured to the tooth by means of a bayonet lock and is moreover permanently connected to the projections or pin on the plate of the denture. If a tooth breaks, the spring-piece can be removed and be introduced into other teeth, which are then permanently connected to the plate of the denture.

One constructional form of the new tooth fastening is shown in the accompanying drawings, wherein—

Figure 1:
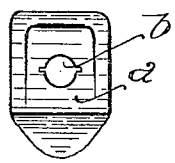
Figure 2:
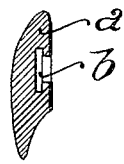
Figure 3:
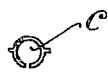
Figure 4:
Figure 5:
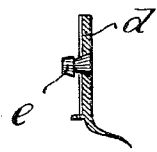
Figure 6:
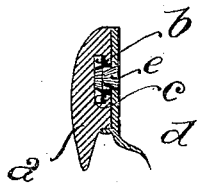

Figure 1 shows in elevation a tooth provided with a recess. Fig. 2 shows the same in section. Figs. 3 and 4 show a spring-piece to be inserted into said recess. Fig. 5 shows the press-knob secured to the plate of the denture. Fig. 6 shows in section the tooth secured to the plate of the denture.

In the event of the tooth being broken off, the part remaining is removed by drawing it off from the press-knob or pin $e$. A new tooth $a$ is taken, the spring-piece $c$ is introduced therein, and connected firmly to the tooth by turning it in the recess $b$ after the manner of a bayonet joint. The tooth $a$ is then pressed on to the press-knob or pin $e$ on the denture plate $d$, in such a manner that the press-knob and spring-piece are permanently connected together.

Having described my invention, what I claim is:—

1. In an artificial denture the combination of a tooth having a front opening, a recessed spring plate within said front opening and a back plate having a conical projection and shoulder for entering the recess of said spring plate and securing said back plate to the tooth.

2. In an artificial denture the combination of a tooth having a front opening, a recessed spring ring within said front opening having side projections and secured to said tooth by a bayonet joint, and a back plate having a conical projection and shoulder for entering the recess of said spring ring and securing said back plate to the tooth.

In testimony whereof I affix my signature in presence of two witnesses.

FRIEDRICH HEYDE.

Witnesses:
  WOLDEMAR HAUPT,
  HENRY HASPER.

Copies of this patent may be obtained for five cents each, by addressing the "Commissioner of Patents, Washington, D. C."